(12) United States Patent
McCarthy et al.

(10) Patent No.: US 9,376,061 B2
(45) Date of Patent: *Jun. 28, 2016

(54) ACCESSORY SYSTEM OF A VEHICLE

(71) Applicant: DONNELLY CORPORATION, Holland, MI (US)

(72) Inventors: Kevin C. McCarthy, Tucson, AZ (US); Eugenie V. Uhlmann, Tucson, AZ (US); Niall R. Lynam, Holland, MI (US)

(73) Assignee: DONNELLY CORPORATION, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,227

(22) Filed: Apr. 23, 2015

(65) Prior Publication Data

US 2015/0224929 A1  Aug. 13, 2015

Related U.S. Application Data

(63) Continuation of application No. 13/050,134, filed on Mar. 17, 2011, now Pat. No. 9,019,091, which is a continuation of application No. 12/536,935, filed on Aug. 6, 2009, now Pat. No. 7,912,646, which is a (Continued)

(51) Int. Cl.
*B60Q 1/00* (2006.01)
*B60R 1/04* (2006.01)
(Continued)

(52) U.S. Cl.
CPC ... *B60R 1/04* (2013.01); *B60R 1/12* (2013.01); *B60R 11/0247* (2013.01);
(Continued)

(58) Field of Classification Search
CPC ........ B60R 1/04; B60R 1/12; B60R 11/0247; B60R 11/0241; B60R 2001/1284; B60R 2011/0026; B60R 2011/0033; B60R 2300/8026; G01C 21/34; G01C 21/36; G01C 21/3626; G01S 19/13; G01S 19/35; G01S 19/36; G01S 19/37; G01S 19/21; G09B 29/10
See application file for complete search history.

(56) References Cited

U.S. PATENT DOCUMENTS 1,096,452 A  5/1914 Perrin
1,563,258 A  11/1925 Cunningham
(Continued)

FOREIGN PATENT DOCUMENTS

AU  A-40317/95  2/1995
CN  1189224  7/1998
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Quang D Pham
(74) *Attorney, Agent, or Firm* — Gardner, Linn, Burkhart & Flory, LLP

(57) ABSTRACT

An accessory system of a vehicle includes a rearward viewing camera, a forward viewing camera and a video display screen disposed in the interior cabin of the vehicle at a location separate from the location of an interior rearview mirror assembly. When the vehicle is executing a reversing maneuver, the video display screen displays images captured by the rearward viewing camera to assist the driver in reversing the vehicle. The video display screen is operable to display other information. During forward travel of the vehicle and responsive to information pertaining to the location of the vehicle and a route to a destination, the video display screen displays forward video images captured by the forward viewing camera and the video display screen displays a graphic overlay on the displayed forward video images that highlights a highway on/off ramp to follow the route to the destination and/or a building of the destination.

20 Claims, 2 Drawing Sheets

Related U.S. Application Data continuation of application No. 11/965,072, filed on Dec. 27, 2007, now Pat. No. 7,580,795, which is a continuation of application No. 11/644,036, filed on Dec. 22, 2006, now Pat. No. 7,328,103, which is a continuation of application No. 10/755,627, filed on Jan. 12, 2004, now Pat. No. 7,158,881, which is a continuation of application No. 10/287,178, filed on Nov. 4, 2002, now Pat. No. 6,678,614, which is a continuation of application No. 09/799,414, filed on Mar. 5, 2001, now Pat. No. 6,477,464, said application No. 10/755,627 is a continuation-in-part of application No. 09/449,121, filed on Nov. 24, 1999, now Pat. No. 6,428,172, said application No. 13/050,134 is a continuation-in-part of application No. 12/536,930, filed on Aug. 6, 2009, now Pat. No. 8,044,776, which is a continuation of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268.

(60) Provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(51) Int. Cl.
　　*B60R 1/12*　　　　(2006.01)
　　*G01C 21/36*　　　(2006.01)
　　*G01S 19/35*　　　(2010.01)
　　*G01S 19/36*　　　(2010.01)
　　*G01S 19/37*　　　(2010.01)
　　*G09B 29/10*　　　(2006.01)
　　*G01C 21/34*　　　(2006.01)
　　*G01S 19/13*　　　(2010.01)
　　*B60R 11/02*　　　(2006.01)
　　*B60R 11/00*　　　(2006.01)
　　*G01S 19/21*　　　(2010.01)

(52) U.S. Cl.
　　CPC .............. *G01C 21/34* (2013.01); *G01C 21/36* (2013.01); *G01C 21/3626* (2013.01); *G01S 19/13* (2013.01); *G01S 19/35* (2013.01); *G01S 19/36* (2013.01); *G01S 19/37* (2013.01); *G09B 29/10* (2013.01); *B60R 11/0241* (2013.01); *B60R 2001/1284* (2013.01); *B60R 2011/0026* (2013.01); *B60R 2011/0033* (2013.01); *B60R 2300/8026* (2013.01); *G01S 19/21* (2013.01)

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,648,229 A | 3/1972 | Burrows et al. |
| 3,650,603 A | 3/1972 | Heilmeier et al. |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| 4,297,401 A | 10/1981 | Chern et al. |
| RE30,835 E | 12/1981 | Giglia |
| 4,306,768 A | 12/1981 | Egging |
| 4,310,851 A | 1/1982 | Pierrat |

(56) References Cited

U.S. PATENT DOCUMENTS

| | | |
|---|---|---|
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,758,040 A | 7/1988 | Kingsley et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,774 A | 12/1988 | Koch et al. |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jerkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |

(56) References Cited

U.S. PATENT DOCUMENTS

| | | |
|---|---|---|
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinama et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A * | 2/1994 | Secor ............... B60K 35/00 348/18 |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,398,134 A | 3/1995 | Ikegaya |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,473,702 A | 12/1995 | Yoshida et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,283 A * | 5/1996 | Desai ............... G01C 21/32 340/990 |
| 5,515,448 A | 5/1996 | Nishitani |
| 5,517,853 A | 5/1996 | Chamussy |

(56) References Cited

U.S. PATENT DOCUMENTS

| | | |
|---|---|---|
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,559,511 A * | 9/1996 | Ito .................... G01C 21/3415 340/460 |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenk et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,694,474 A | 12/1997 | Ngo et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,731,886 A | 3/1998 | Taber et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| 5,754,665 A | 5/1998 | Hosoi |
| D394,833 S | 6/1998 | Muth |
| 5,760,242 A | 6/1998 | Igarashi et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A * | 8/1998 | Schofield ............... B60N 2/002 250/208.1 |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |

(56) References Cited

U.S. PATENT DOCUMENTS

| | | |
|---|---|---|
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A * | 12/1998 | Van Ryzin ......... G01C 21/3602 340/905 |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,917,944 A | 6/1999 | Wakisaka et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,345 A | 9/1999 | Beckert et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,973,922 A | 10/1999 | Kamphuis |
| 5,975,715 A | 11/1999 | Bauder |
| 5,978,017 A | 11/1999 | Tino |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzuki et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |

(56) References Cited

U.S. PATENT DOCUMENTS

| | | |
|---|---|---|
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A * | 9/2000 | Marcus ............... B60C 23/0401 307/10.1 |
| 6,124,886 A | 9/2000 | DeLine et al. |
| 6,125,326 A * | 9/2000 | Ohmura ............... G01C 21/3688 342/457 |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,140,943 A * | 10/2000 | Levine ............... G01C 21/3647 340/905 |
| 6,142,656 A | 11/2000 | Kurth |
| 6,144,318 A * | 11/2000 | Hayashi ............... G01C 21/3658 340/988 |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A * | 11/2000 | Steed .................... B60Q 1/0023 348/148 |
| 6,151,539 A | 11/2000 | Bergholz et al. |
| 6,152,551 A | 11/2000 | Annas |
| 6,152,590 A | 11/2000 | Fürst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,071 A | 12/2000 | Shuman et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,379 B1 | 2/2001 | Tonar et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 * | 3/2001 | Walker ............... G01C 21/3647 340/995.2 |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,246,933 B1 | 6/2001 | Bague |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,275,231 B1 | 8/2001 | Obradovich |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |

(56) References Cited

U.S. PATENT DOCUMENTS

| | | | |
|---|---|---|---|
| 6,304,173 B2 | 10/2001 | Pala et al. | |
| 6,305,807 B1 | 10/2001 | Schierbeek | |
| 6,310,611 B1 | 10/2001 | Caldwell | |
| 6,310,714 B1 | 10/2001 | Lomprey et al. | |
| 6,310,738 B1 | 10/2001 | Chu | |
| 6,313,454 B1 | 11/2001 | Bos et al. | |
| 6,314,295 B1 | 11/2001 | Kawamoto | |
| 6,315,440 B1 | 11/2001 | Satoh | |
| 6,317,057 B1 | 11/2001 | Lee | |
| 6,317,180 B1 | 11/2001 | Kuroiwa et al. | |
| 6,317,248 B1 | 11/2001 | Agrawal et al. | |
| 6,318,870 B1 | 11/2001 | Spooner et al. | |
| 6,320,176 B1 | 11/2001 | Schofield et al. | |
| 6,320,282 B1 | 11/2001 | Caldwell | |
| 6,320,612 B1 * | 11/2001 | Young | B60R 1/00 348/148 |
| 6,324,295 B1 | 11/2001 | Valery et al. | |
| 6,326,613 B1 | 12/2001 | Heslin et al. | |
| 6,326,900 B2 | 12/2001 | DeLine et al. | |
| 6,327,925 B1 | 12/2001 | Gombert et al. | |
| 6,329,925 B1 | 12/2001 | Skiver et al. | |
| 6,330,511 B2 | 12/2001 | Ogura et al. | |
| 6,331,066 B1 | 12/2001 | Desmond et al. | |
| 6,333,759 B1 | 12/2001 | Mazzilli | |
| 6,335,680 B1 | 1/2002 | Matsuoka | |
| 6,336,737 B1 | 1/2002 | Thau | |
| 6,340,850 B2 | 1/2002 | O'Farrell et al. | |
| 6,341,523 B2 | 1/2002 | Lynam | |
| 6,344,805 B1 | 2/2002 | Yasui et al. | |
| 6,346,698 B1 | 2/2002 | Turnbull | |
| 6,347,880 B1 | 2/2002 | Fürst et al. | |
| 6,348,858 B2 | 2/2002 | Weis et al. | |
| 6,351,708 B1 | 2/2002 | Takagi et al. | |
| 6,353,392 B1 | 3/2002 | Schofield et al. | |
| 6,356,206 B1 | 3/2002 | Takenaga et al. | |
| 6,356,376 B1 | 3/2002 | Tonar et al. | |
| 6,356,389 B1 | 3/2002 | Nilsen et al. | |
| 6,357,883 B1 | 3/2002 | Strumolo et al. | |
| 6,362,121 B1 | 3/2002 | Chopin et al. | |
| 6,362,548 B1 | 3/2002 | Bingle et al. | |
| 6,363,326 B1 | 3/2002 | Scully | |
| 6,366,013 B1 | 4/2002 | Leenders et al. | |
| 6,366,213 B2 | 4/2002 | DeLine et al. | |
| 6,369,701 B1 | 4/2002 | Yoshida et al. | |
| 6,370,329 B1 | 4/2002 | Teuchert | |
| 6,371,636 B1 | 4/2002 | Wesson | |
| 6,374,183 B1 * | 4/2002 | Oshida | G01C 21/3626 340/990 |
| 6,379,013 B1 | 4/2002 | Bechtel et al. | |
| 6,379,788 B2 | 4/2002 | Choi et al. | |
| 6,382,805 B1 | 5/2002 | Miyabukuro | |
| 6,385,139 B1 | 5/2002 | Arikawa et al. | |
| 6,386,742 B1 | 5/2002 | DeLine et al. | |
| 6,390,529 B1 | 5/2002 | Bingle et al. | |
| 6,390,626 B2 | 5/2002 | Knox | |
| 6,390,635 B2 | 5/2002 | Whitehead et al. | |
| 6,396,397 B1 | 5/2002 | Bos et al. | |
| 6,396,408 B2 | 5/2002 | Drummond et al. | |
| 6,396,637 B2 | 5/2002 | Roest et al. | |
| 6,407,468 B1 | 6/2002 | LeVesque et al. | |
| 6,407,847 B1 | 6/2002 | Poll et al. | |
| 6,408,247 B1 | 6/2002 | Ichikawa et al. | |
| 6,411,204 B1 | 6/2002 | Bloomfield et al. | |
| 6,412,959 B1 | 7/2002 | Tseng | |
| 6,412,973 B1 | 7/2002 | Bos et al. | |
| 6,414,910 B1 | 7/2002 | Kaneko et al. | |
| 6,415,230 B1 | 7/2002 | Maruko et al. | |
| 6,416,208 B2 | 7/2002 | Pastrick et al. | |
| 6,417,786 B2 | 7/2002 | Learman et al. | |
| 6,418,376 B1 | 7/2002 | Olson | |
| 6,419,300 B1 | 7/2002 | Pavao et al. | |
| 6,420,036 B1 | 7/2002 | Varaprasad et al. | |
| 6,420,800 B1 | 7/2002 | LeVesque et al. | |
| 6,420,975 B1 | 7/2002 | DeLine et al. | |
| 6,421,081 B1 | 7/2002 | Markus | |
| 6,424,272 B1 | 7/2002 | Gutta et al. | |
| 6,424,273 B1 | 7/2002 | Gutta et al. | |
| 6,424,786 B1 | 7/2002 | Beeson et al. | |
| 6,424,892 B1 | 7/2002 | Matsuoka | |
| 6,426,492 B1 | 7/2002 | Bos et al. | |
| 6,426,568 B2 | 7/2002 | Turnbull et al. | |
| 6,427,349 B1 | 8/2002 | Blank et al. | |
| 6,428,172 B1 | 8/2002 | Hutzel et al. | |
| 6,433,676 B2 | 8/2002 | DeLine et al. | |
| 6,433,680 B1 | 8/2002 | Ho | |
| 6,433,914 B1 | 8/2002 | Lomprey et al. | |
| 6,437,688 B1 | 8/2002 | Kobayashi | |
| 6,438,491 B1 | 8/2002 | Farmer | |
| 6,439,755 B1 | 8/2002 | Fant, Jr. et al. | |
| 6,441,872 B1 | 8/2002 | Ho | |
| 6,441,943 B1 | 8/2002 | Roberts et al. | |
| 6,441,963 B2 | 8/2002 | Murakami et al. | |
| 6,441,964 B1 | 8/2002 | Chu et al. | |
| 6,445,287 B1 * | 9/2002 | Schofield | B60R 1/1207 340/442 |
| 6,447,128 B1 | 9/2002 | Lang et al. | |
| 6,449,082 B1 | 9/2002 | Agrawal et al. | |
| 6,452,533 B1 | 9/2002 | Yamabuchi et al. | |
| 6,452,572 B1 | 9/2002 | Fan et al. | |
| 6,456,438 B1 | 9/2002 | Lee et al. | |
| 6,462,795 B1 | 10/2002 | Clarke | |
| 6,463,369 B2 | 10/2002 | Sadano et al. | |
| 6,466,701 B1 | 10/2002 | Ejiri et al. | |
| 6,471,362 B1 | 10/2002 | Carter et al. | |
| 6,472,977 B1 | 10/2002 | Pöchmüller | |
| 6,472,979 B2 | 10/2002 | Schofield et al. | |
| 6,473,001 B1 | 10/2002 | Blum | |
| 6,474,853 B2 | 11/2002 | Pastrick et al. | |
| 6,476,731 B1 | 11/2002 | Miki et al. | |
| 6,476,855 B1 * | 11/2002 | Yamamoto | B60R 1/00 348/148 |
| 6,477,460 B2 | 11/2002 | Kepler | |
| 6,477,464 B2 | 11/2002 | McCarthy et al. | |
| 6,483,429 B1 | 11/2002 | Yasui et al. | |
| 6,483,438 B2 | 11/2002 | DeLine et al. | |
| 6,483,613 B1 | 11/2002 | Woodgate et al. | |
| 6,487,500 B2 | 11/2002 | Lemelson et al. | |
| 6,494,602 B2 | 12/2002 | Pastrick et al. | |
| 6,498,620 B2 * | 12/2002 | Schofield | B60N 2/002 348/118 |
| 6,501,387 B2 | 12/2002 | Skiver et al. | |
| 6,512,203 B2 | 1/2003 | Jones et al. | |
| 6,512,624 B2 | 1/2003 | Tonar et al. | |
| 6,513,252 B1 | 2/2003 | Schierbeek et al. | |
| 6,515,378 B2 | 2/2003 | Drummond et al. | |
| 6,515,581 B1 | 2/2003 | Ho | |
| 6,515,582 B1 | 2/2003 | Teowee | |
| 6,515,597 B1 | 2/2003 | Wada et al. | |
| 6,516,664 B2 | 2/2003 | Lynam | |
| 6,518,691 B1 | 2/2003 | Baba | |
| 6,519,209 B1 | 2/2003 | Arikawa et al. | |
| 6,520,667 B1 | 2/2003 | Mousseau | |
| 6,522,451 B1 | 2/2003 | Lynam | |
| 6,522,969 B2 | 2/2003 | Kannonji | |
| 6,525,707 B1 | 2/2003 | Kaneko et al. | |
| 6,534,884 B2 | 3/2003 | Marcus et al. | |
| 6,538,709 B1 | 3/2003 | Kurihara et al. | |
| 6,539,306 B2 | 3/2003 | Turnbull et al. | |
| 6,542,085 B1 | 4/2003 | Yang | |
| 6,542,182 B1 | 4/2003 | Chautorash | |
| 6,543,163 B1 | 4/2003 | Ginsberg | |
| 6,545,598 B1 | 4/2003 | de Villeroche | |
| 6,549,253 B1 | 4/2003 | Robbie et al. | |
| 6,549,335 B1 | 4/2003 | Trapani et al. | |
| 6,550,949 B1 | 4/2003 | Bauer et al. | |
| 6,552,326 B2 | 4/2003 | Turnbull | |
| 6,552,653 B2 | 4/2003 | Nakaho et al. | |
| 6,553,308 B1 | 4/2003 | Uhlmann et al. | |
| 6,559,761 B1 | 5/2003 | Miller et al. | |
| 6,559,902 B1 | 5/2003 | Kusuda et al. | |
| 6,560,004 B2 | 5/2003 | Theiste et al. | |
| 6,560,027 B2 | 5/2003 | Meine | |
| 6,566,821 B2 | 5/2003 | Nakatsuka et al. | |
| 6,567,060 B1 | 5/2003 | Sekiguchi | |

(56) References Cited

U.S. PATENT DOCUMENTS

| | | | |
|---|---|---|---|
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takashashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,288 B2 | 9/2003 | Duroux et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,667,726 B1 | 12/2003 | Damiani et al. |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1* | 1/2004 | Bauer ............... B60Q 1/0023 340/425.5 |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |

(56) References Cited

U.S. PATENT DOCUMENTS

| | | |
|---|---|---|
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,954,300 B2 | 10/2005 | Varaprasad et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,967,569 B2 | 11/2005 | Weber et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wong |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,170,518 B1 * | 1/2007 | Millington ............ G01C 21/367 345/428 |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,221,365 B1 | 5/2007 | Lévesque et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,232,594 B2 | 6/2007 | Miroshin et al. |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 * | 7/2007 | Takagi ..................... B60R 1/00 340/937 |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |

(56) References Cited

U.S. PATENT DOCUMENTS

| | | | |
|---|---|---|---|
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,292,918 B2 | 11/2007 | Silvester |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 * | 8/2009 | Schofield ............... B60C 23/00 340/425.5 |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 * | 11/2009 | Lynam ............... B60K 35/00 340/425.5 |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |

(56) References Cited

U.S. PATENT DOCUMENTS

| | | |
|---|---|---|
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,170,748 B1 | 5/2012 | Schofield et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,254,011 B2 | 8/2012 | Baur et al. |
| 8,267,559 B2 | 9/2012 | DeLine et al. |
| 8,271,187 B2 | 9/2012 | Taylor et al. |
| 8,277,059 B2 | 10/2012 | McCabe et al. |
| 8,282,224 B2 | 10/2012 | Anderson et al. |
| 8,282,226 B2 | 10/2012 | Blank et al. |
| 8,282,253 B2 | 10/2012 | Lynam |
| 8,288,711 B2 | 10/2012 | Heslin et al. |
| 8,294,975 B2 | 10/2012 | Varaprasad et al. |
| 8,304,711 B2 | 11/2012 | Drummond et al. |
| 8,308,325 B2 | 11/2012 | Takayanagi et al. |
| 8,309,907 B2 | 11/2012 | Heslin et al. |
| 8,325,028 B2 | 12/2012 | Schofield et al. |
| 8,335,032 B2 | 12/2012 | McCabe et al. |
| 8,339,526 B2 | 12/2012 | Minikey, Jr. et al. |
| 8,355,853 B2 | 1/2013 | Schofield et al. |
| 8,358,262 B2 | 1/2013 | Degwekar et al. |
| 8,379,289 B2 | 2/2013 | Schofield et al. |
| 8,400,704 B2 | 3/2013 | McCabe et al. |
| 8,411,245 B2 | 4/2013 | Lee et al. |
| 8,427,288 B2 | 4/2013 | Schofield et al. |
| 8,432,600 B2 | 4/2013 | Brown et al. |
| 8,462,204 B2 | 6/2013 | Schofield et al. |
| 8,465,162 B2 | 6/2013 | Weller et al. |
| 8,465,163 B2 | 6/2013 | Blank et al. |
| 8,482,683 B2 | 7/2013 | Hwang et al. |
| 8,506,096 B2 | 8/2013 | McCabe et al. |
| 8,508,383 B2 | 8/2013 | Peterson et al. |
| 8,508,384 B2 | 8/2013 | Uken et al. |
| 8,511,841 B2 | 8/2013 | Varaprasad et al. |
| 8,520,069 B2 | 8/2013 | Haler |
| 8,525,703 B2 | 9/2013 | McCarthy et al. |
| 8,543,330 B2 | 9/2013 | Taylor et al. |
| 8,545,030 B2 | 10/2013 | Anderson et al. |
| 8,559,093 B2 | 10/2013 | Varaprasad et al. |
| 8,577,549 B2 | 11/2013 | Schofield et al. |
| 8,582,052 B2 | 11/2013 | Ockerse |
| 8,608,327 B2 | 12/2013 | Blank et al. |
| 8,610,992 B2 | 12/2013 | Varaprasad et al. |
| 8,653,959 B2 | 2/2014 | Lynam et al. |
| 8,705,161 B2 | 4/2014 | Schofield et al. |
| 8,779,910 B2 | 7/2014 | DeLine et al. |
| 8,797,627 B2 | 8/2014 | McCabe et al. |
| 8,866,905 B2* | 10/2014 | Yamamoto ............... B60R 1/00 348/116 |
| 2001/0020202 A1 | 9/2001 | Obradovich |
| 2001/0026316 A1 | 10/2001 | Senatore |
| 2001/0035853 A1 | 11/2001 | Hoelen et al. |
| 2001/0039475 A1* | 11/2001 | McCarthy ............... B60R 1/12 701/468 |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0141086 A1* | 10/2002 | Lang ............... B60R 1/00 359/871 |
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1* | 7/2003 | Lewellen ............... H04N 7/181 348/148 |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |

(56) References Cited

U.S. PATENT DOCUMENTS

| | | |
|---|---|---|
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittlemann et al. |
| 2005/0237440 A1 | 10/2005 | Sugimura et al. |
| 2005/0270766 A1 | 12/2005 | Kung et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2009/0052003 A1 | 2/2009 | Schofield et al. |
| 2009/0096937 A1* | 4/2009 | Bauer ............... B60R 1/12 348/739 |
| 2009/0201137 A1 | 8/2009 | Weller et al. |
| 2009/0243824 A1* | 10/2009 | Peterson ............ B60R 1/12 340/435 |
| 2009/0258221 A1 | 10/2009 | Diehl et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1* | 11/2010 | Hwang ............... B60R 1/00 349/114 |
| 2011/0166779 A1 | 7/2011 | McCarthy et al. |
| 2011/0273659 A1 | 11/2011 | Sobecki et al. |
| 2012/0203550 A1 | 8/2012 | Skiver et al. |
| 2012/0236152 A1 | 9/2012 | De Wind et al. |
| 2013/0027952 A1 | 1/2013 | Lynam et al. |
| 2013/0229522 A1 | 9/2013 | Schofield et al. |
| 2015/0088411 A1* | 3/2015 | Foster ............... G01C 21/3626 701/410 |

FOREIGN PATENT DOCUMENTS

| | | |
|---|---|---|
| DE | 941408 | 4/1956 |
| DE | 944531 | 7/1956 |
| DE | 2808260 | 8/1979 |
| DE | 3248511 | 7/1984 |
| DE | 3301945 | 7/1984 |
| DE | 3614882 | 11/1987 |
| DE | 3720848 | 1/1989 |
| DE | 9306989 | 7/1993 |
| DE | 4329983 | 8/1995 |
| DE | 4444443 | 6/1996 |
| DE | 29703084 | 6/1997 |
| DE | 29805142 | 5/1998 |
| DE | 19741896 | 4/1999 |
| DE | 19755008 | 7/1999 |
| DE | 29902344 | 7/1999 |
| DE | 19934999 | 2/2001 |
| DE | 19943355 | 3/2001 |
| DE | 20118868 | 3/2002 |
| DE | 10131459 | 1/2003 |
| DE | 102005000650 | 7/2006 |
| EP | 0299509 | 1/1989 |
| EP | 0513476 | 11/1992 |
| EP | 0524766 | 1/1993 |
| EP | 0729864 | 12/1995 |
| EP | 0728618 | 8/1996 |
| EP | 0825477 | 2/1998 |
| EP | 0830985 | 3/1998 |
| EP | 0928723 | 7/1999 |
| EP | 937601 | 8/1999 |
| EP | 1075986 | 2/2001 |
| EP | 1097848 | 5/2001 |
| EP | 1152285 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 | 2/1953 |
| FR | 1461419 | 12/1966 |
| FR | 2585991 | 2/1987 |
| FR | 2672857 | 8/1992 |
| FR | 2673499 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 | 10/1984 |
| GB | 2161440 | 1/1986 |
| GB | 2192370 | 1/1988 |
| GB | 2222991 | 3/1990 |
| GB | 2255539 | 11/1992 |
| GB | 2351055 | 12/2000 |
| GB | 2362494 | 11/2001 |
| JP | 50-000638 | 1/1975 |
| JP | 52-146988 | 11/1977 |
| JP | 55-039843 | 3/1980 |
| JP | 57-30639 | 2/1982 |
| JP | 57-102602 | 6/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 03-028947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-213113 | 8/1993 |
| JP | 05-257142 | 10/1993 |
| JP | 60-80953 | 3/1994 |
| JP | 61-07035 | 4/1994 |
| JP | 62-27318 | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |

(56) References Cited

FOREIGN PATENT DOCUMENTS

| | | |
|---|---|---|
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| KR | 20090031998 | 3/2009 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cros/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P. B. Denyer and M. Lu, CMOS Video Cameras, article, 1991, 4 pages, University of Edinburgh, UK.

N. R. Lynam, "Electrochromic Automotive Day/Night Mirror," SAE Technical Paper Series, 870636 (1987).

N. R. Lynam, "Smart Windows for Automobiles," SAE Technical Paper Series, 900419 (1990).

N. R. Lynam and A. Agrawal, "Automotive Applications of Chromogenic Materials," from Large Area Chromogenics: Materials and Devices for Transmittance Control, C. M. Lampert and C. G. Granquist, EDS, Optical Engineering Press, Washington (1990).

"Combination of rain sensing, autolamps and telephone antenna in one module," Research Disclosure, Kenneth Mason Publications, Hampshire, GB No. 412, Aug. 1998, p. 1045XP-000824825.

* cited by examiner

ACCESSORY SYSTEM OF A VEHICLE

CROSS-REFERENCE TO RELATED APPLICATIONS

The present application is a continuation of U.S. patent application Ser. No. 13/050,134, filed Mar. 17, 2011, now U.S. Pat. No. 9,019,091, which is a continuation of U.S. patent application Ser. No. 12/536,935, filed Aug. 6, 2009, now U.S. Pat. No. 7,912,646, which is a continuation of U.S. patent application Ser. No. 11/965,072, filed Dec. 27, 2007, now U.S. Pat. No. 7,580,795, which is a continuation of U.S. patent application Ser. No. 11/644,036, filed Dec. 22, 2006, now U.S. Pat. No. 7,328,103, which is a continuation of U.S. patent application Ser. No. 10/755,627, filed Jan. 12, 2004, now U.S. Pat. No. 7,158,881, which is a continuation of U.S. patent application Ser. No. 10/287,178, filed on Nov. 4, 2002, now U.S. Pat. No. 6,678,614, which is a continuation of patent application Ser. No. 09/799,414, filed on Mar. 5, 2001, now U.S. Pat. No. 6,477,464, which claims priority from U.S. provisional application Ser. No. 60/187,960, filed on Mar. 9, 2000, the disclosures of which are hereby incorporated herein by reference in their entireties, and application Ser. No. 10/755,627 is a continuation-in-part of U.S. patent application Ser. No. 09/449,121, filed on Nov. 24, 1999, now U.S. Pat. No. 6,428,172; and application Ser. No. 13/050,134 is a continuation-in-part of U.S. patent application Ser. No. 12/536,930, filed Aug. 6, 2009, now U.S. Pat. No. 8,044,776, which is a continuation of U.S. patent application Ser. No. 12/052,341, filed Mar. 20, 2008, now U.S. Pat. No. 7,579,940, which is a continuation of U.S. patent application Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. application Ser. No. 09/793,002, filed Feb. 26, 2001, now U.S. Pat. No. 6,690,268, which claims benefit of U.S. provisional application, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000.

BACKGROUND OF THE INVENTION

Vehicle-based global-positioning systems (GPS) are capable of providing complete mapping information, including street layout, street names, directions, landmarks, addresses, and the like. However, consumers often have difficulty reading maps, especially when presented on a video screen, and the study of complex information, such as a map while driving, may dangerously distract from the driving task. Vehicle mirror assemblies are desirable locations for an GPS antenna, such as disclosed in commonly assigned U.S. Pat. No. 5,971,552, the entire disclosure of which is hereby incorporated by reference.

SUMMARY OF THE INVENTION

The present invention fulfills a need to intelligently filter mapping information in a manner that provides useful and usable data to the driver. The present invention also provides an economical driver-usable global-positioning system (GPS) display. A vehicular rearview mirror-based navigation system, according to an aspect of the invention, includes a rearview mirror system, including an interior rearview mirror assembly. The interior rearview mirror assembly includes an interior reflective element and an interior mirror housing for the interior reflective element. The interior rearview mirror assembly further includes a scrolling display. The scrolling display displays scrolling driver informational messages on the scrolling display.

A vehicular review mirror-based navigation system, according to another aspect of the invention, includes a rearview mirror system having an interior rearview mirror assembly. The interior rearview mirror assembly includes an interior reflective element and an interior mirror housing for the interior reflective element. The interior rearview mirror assembly further includes a GPS display. The GPS display receives an output from a GPS receiving system and displays turn-by-turn information to a vehicle driver.

One aspect of the present invention offers a complete GPS system, including antenna, receiver and a GPS information display into a vehicular mirror assembly, and particularly an interior rearview mirror assembly. Provision of such a mirror-mounted GPS system as a unitary, complete assembly has several advantages, including obviating an automaker from having to specifically design a dashboard or other interior cabin spaces and would decrease the time to market associated with such level of feature integration. Also, provision of a mirror-mounted GPS system as a unitary, complete assembly facilitates supply of such assemblies as retrofits and as aftermarket installations, and generally increases an automaker's ability to offer a GPS feature as an option on selected vehicles.

A particular advantage from locating the information display of a GPS system at the interior rearview mirror assembly in the interior vehicular cabin is that such a mirror-mounted GPS display can facilitate multi-tasking by the driver. Thus, there is a need to intelligently filter mapping information to provide useful, but usable, data to the driver. A further object of this present invention is to economically provide a driver-usable GPS display. Map displays are currently one of the largest cost factors in vehicle navigational systems. Thus, it would be desirable to avoid or reduce this cost by providing a simpler means of display to the driver.

Another aspect of this invention is the location of the GPS antenna and the receiver in the exterior side view assembly. A further aspect is the processing by that exterior side view mirror receiver of GPS location data received by the antenna and fed from there to the receiver, providing an output from that location, that is external to the vehicle cabin, into the vehicle cabin. This has the advantage of the optimal field of view for the antenna for communication to GPS satellites. The placement of the receiver in an exterior side view mirror assembly in close proximity to the antenna also is preferred to avoid RFI and EMC issues associated with low level RF signals. Locating the GPS antenna at a distance from the GPS receiver may render the GPS system subject to stray RF noise from cellular phones and high power portable transmitters, such as CB's and handheld radios.

DESCRIPTION OF THE PREFERRED EMBODIMENT

Figure 1:
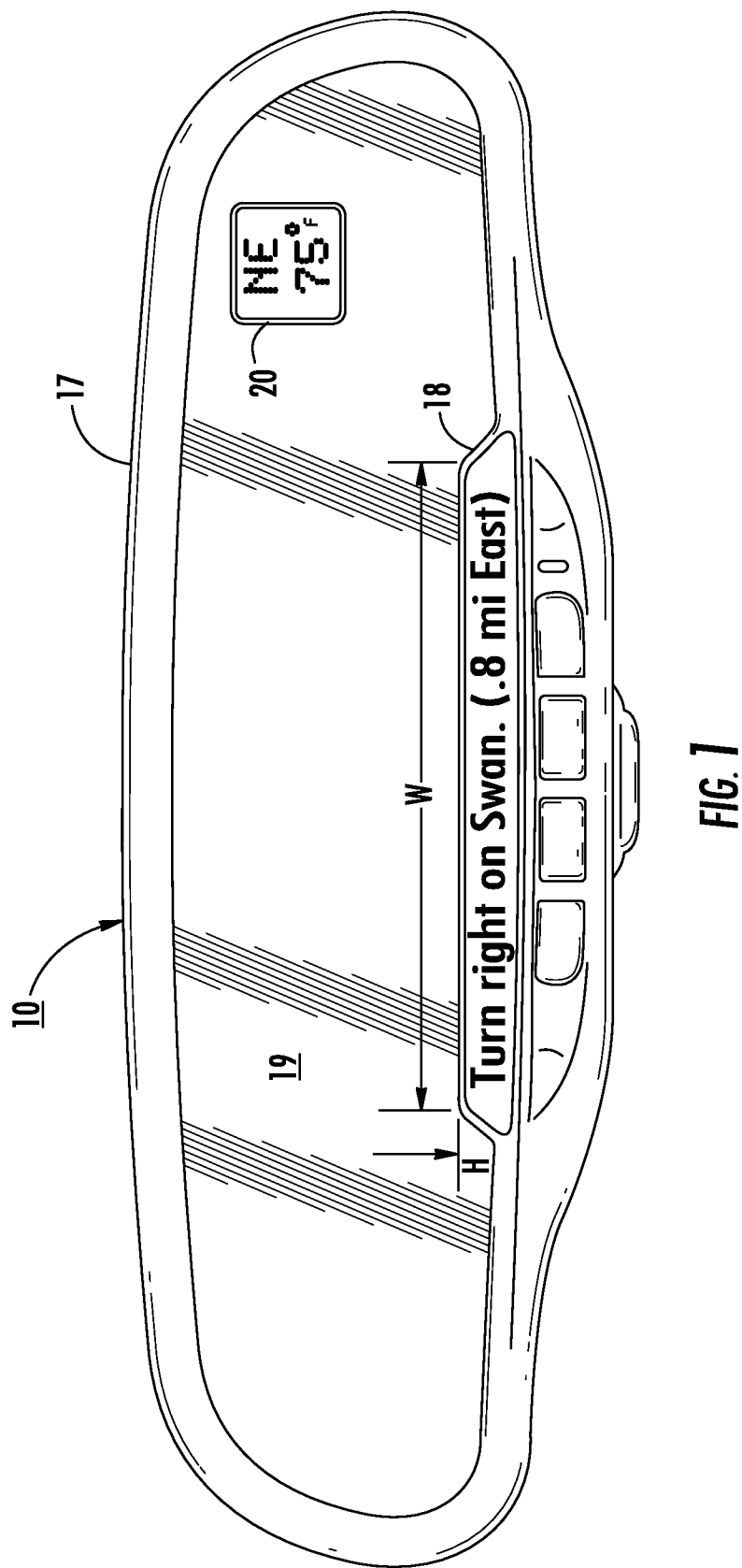
FIG. 1 is a front elevation of a vehicular rearview mirror assembly, according to the invention.
Figure 2:
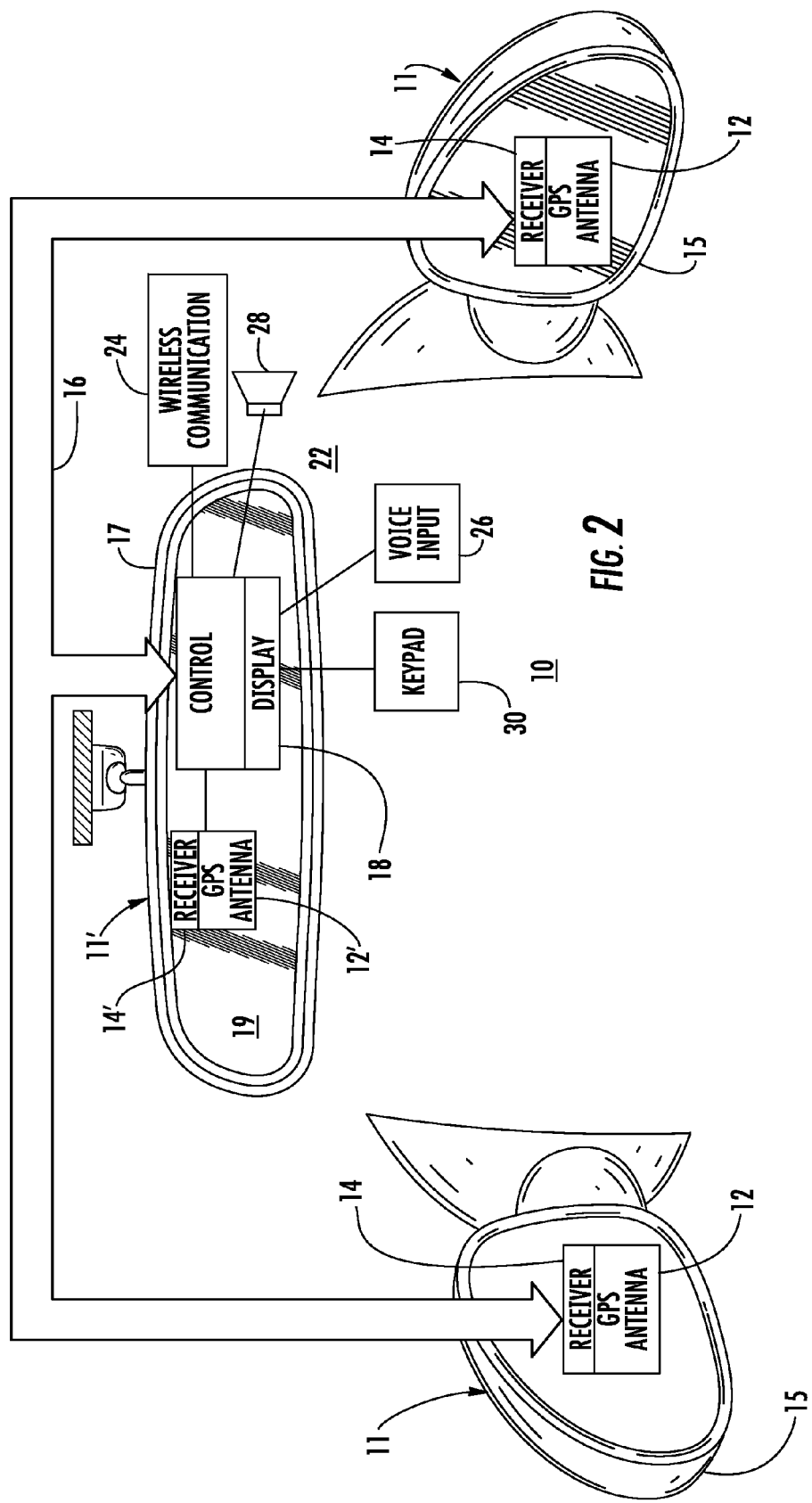
FIG. 2 is a block diagram of a vehicular rearview mirror-based navigation system, according to the invention.

Referring now to the drawings and the illustrated embodiments depicted therein, a vehicular rearview mirror-based navigation system 10, in a preferred embodiment of the present invention, includes one or more GPS receiving systems 11 exterior mirror-mounted antennas 12 that receive location information form GPS satellites. A GPS receiver 14, to which is connected the GPS antenna 12, may also be mounted within an exterior side view mirror assembly 15. The geographic data output from the GPS receiver 14 is then transferred to an interior rearview mirror assembly 17 for display with the driver via a communication channel 16 such as by a wire connection, a vehicle data bus connection such as a LIN (Local Interconnect Network) or a CAN bus, as known in the art, or wirelessly such as via short-range RF data transmission using a protocol such as the BLUETOOTH protocol such as is available from Motorola of Schaumberg, Ill. Alternatively, a GPS receiving system 11 including an interior-mounted GPS antenna 12' and GPS receiver 14' may be mounted at interior rearview mirror assembly 17. More particularly, the interior-mounted GPS antenna 12' and/or the GPS receiver 14' may be positioned at either the movable portion of the interior rearview mirror assembly or the fixed portion of the interior rearview mirror assembly. Preferably, the display of the GPS information at interior rearview mirror assembly 17 provides driver informational messages such as turn-by-turn instructions, such as shown in FIG. 1. This can be displayed using a dot-matrix, pixelated display 18 such as vacuum fluorescent display or an organic electro-luminescent display or a field-emission display or a plasma display or a similar light-emitting display, or by a non-emitting display such as a liquid crystal display in the chin of the interior mirror assembly mirror, in an eyebrow over the mirror and/or in a display visible within the mirror reflector 19 which would update the driver by line-by-line or by scrolling messages which keep the driver updated using GPS positioning techniques such as differential location discrimination which has preferred accuracy of less than 5 m.

Another aspect of the present invention to the simplification of driver instructions is the use of a simple compass/directional heading display 20 at the interior mirror assembly. For example, if the system needed to communicate that the driver needed to turn right when heading north, heading display 18 may flash the "East" compass heading. Audible alerts or other noises could alert the driver that a directional change was needed. Another means of display could be arrows and the like.

A further aspect of the present invention is the data input generally shown at 22. The driver will typically desire to input the destination to the GPS system. This can be done several ways. A preferred method would be to take advantage of an existing vehicular wireless telecommunication system 24. Many existing mirror products are already the location for these systems. For example, the driver would activate a vehicular wireless communication system such as the ONSTAR™ system at General Motors which would contact a remote operator or remote voice input system. This may be accomplished utilizing principles disclosed in commonly assigned U.S. patent application Ser. No. 09/466,010 filed Dec. 17, 1999, now U.S. Pat. No. 6,420,975; Ser. No. 09/396,179 filed Sep. 14, 1999, now U.S. Pat. No. 6,278,377; Ser. No. 09/382,720 filed Aug. 25, 1999, now U.S. Pat. No. 6,243,003; Ser. No. 09/449,121 filed Nov. 24, 1999, now U.S. Pat. No. 6,428,172; Ser. No. 09/433,467 filed Nov. 4, 1999, now U.S. Pat. No. 6,326,613; and Ser. No. 09/448,700 filed Nov. 24, 1999, now U.S. Pat. No. 6,329,925, the disclosures of which are hereby incorporated herein by reference. The driver would then tell the operator, such as via a voice input 26, the desired final destination; this takes advantage of the operators' vast data banks for locations and human interaction to help find the destination of choice if you do not know the exact address. The operator would then download the turn-by-turn directions to your mirror. The driver will then be notified by the scrolling messages on the display in the mirror when to turn, how far until the turn, and the direction. The GPS system could update the display in real time as you travel. Audible chirps delivered by a speaker 28 could alert the driver when approaching a turn or if the driver has missed a turn. Thus, the remote ONSTAR™ or equivalent system maintains the detailed maps and directories, and this is fed back wirelessly to the vehicle for display at the interior rearview mirror of directional guidance information.

In addition to this, the driver may simply have a keypad 30 to enter the destination by spelling the address. Keypad 30 could be hardwire-connected to internal rearview mirror 17 or be connected via a wireless link.

BLUETOOTH technology from Motorola, or a similar short-range RF transmission system, could be incorporated for wireless interface with the GPS receiver. This allows for better performance in urban canyons and locations with extreme foliage. The exterior mirror-mounted GPS system 11 could improve handheld GPS devices due to a more powerful antenna 12, which does not operate from a small handheld battery or suffer from the limited size and weight constraints. In addition, the vehicular GPS system could have more data storage, faster processing speeds, increased bandwidth for full internet access, increased software and potential to transfer data via 2-way paging such Creatalink 2 by Motorola thereby lowering operating costs to the user. The data could then be transferred back to the mobile unit for display or storage or the handheld features could then be transferred to the vehicle for hands free operation through voice recognition. This could also include smart phones with an IP address and personal digital assistants (PDA). In addition, smart cards might be inserted into the mirror and information exchanged in this manner.

The driver could also simply have the instructions downloaded to mirror 17 without GPS system 11. This would involve the operator using their cellular service to triangulate your position then download the turn-by-turn directions to your mirror based on your current position and your destination. Then, as you complete each step of the direction, you can scroll to the next direction. This eliminates the cost of the GPS solution, but may not allow for real time positioning. It does offer a simple and effective way to display the information to the driver in a location where the driver is not forced to take their eyes off the road.

It is preferred that the display of GPS-derived driving directional instructions and allied information be displayed at interior mirror assembly 17 as a reconfigurable display such as a multi-pixel display with individually addressable display pixel elements, such as is known in the display arts. Also, it is preferable that the display have an aspect ratio (defined as ratio of the width dimension of the display to its height dimension) of at least about 3, more preferably at least about 5, and most preferably at least about 10 in order to present driving instructions to the driver in a readily readable form. For example, the "Turn right on Swan, etc." driver instruction shown at the interior mirror assembly in FIG. 1 has a desirably large aspect ratio. Also, preferably, the width dimension W of the display is at least about 4 cm, more preferably at least about 6 cm and most preferably at least about 10 cm in width dimension. Also, preferably, the height dimension H is at least about 0.5 cm, more preferably at least about 0.6 cm and most preferably at least about 1 cm in height dimension. Use of the preferred aspect ratios and dimensions ensures that the driver can readily read and interpret the mirror-displayed driving instructions.

Also, where display 18 is disposed behind reflective element 19 of interior mirror assembly 17, and when the reflective element is an electrically variable reflectance element such as an electro-optic mirror such as an electrochromic mirror, it is preferred that the intensity of the scrolling GPS-derived directional information display be increased whenever any overlaying variable opacity element, such as an electrochromic medium, decreases in transmission. Thus, when an electrochromic mirror element that the display is viewed through dims, the intensity of the display increases to compensate for the mirror dimming, such as is disclosed in U.S. Pat. Nos. 5,285,060 and 5,416,313, the entire disclosures of which are hereby incorporated herein.

Further, scrolling GPS-derived driving instruction information can be displayed at an interior mirror-mounted video screen, such as is disclosed in provisional pat. application Ser. No. 60/186,520 filed Mar. 2, 2000, and in commonly assigned U.S. patent application Ser. No. 09/449,121 filed Nov. 24, 1999, now U.S. Pat. No. 6,428,172, the entire disclosures of which are hereby incorporated herein.

Also, optionally, a forward-facing video camera, such as a CMOS or CCD camera, can be mounted to the vehicle, such as disclosed in commonly assigned U.S. Pat. No. 5,796,094 and published International Application No. WO 99/23828, the disclosures of which are hereby incorporated herein by reference, that views the forward scene ahead of the vehicle as it travels on a road. Optionally, the video image of the forward scene can be displayed at a mirror-mounted video screen, or at a video screen mounted elsewhere in the vehicle cabin such as in or at the dashboard. Preferably, a computer-produced graphic overlayer/image highlight/picture-in-a-picture for this forward-viewing video image is generated that is derived from geographic information received from the in-vehicle GPS system. Thus, the driver can view a video screen, which preferably is located at the interior rearview mirror assembly, and can see a graphic overlay on the captured forward video image that guides the driver to turn left or right at an upcoming intersection whose image is displayed on the video screen, a highway on/off ramp the driver is to take can be highlighted on the video screen, a destination building can be highlighted (such as by flashing the part of the video screen where the building is being displayed), etc.

Also, where a video-based rear vision display is included in the vehicle, such as disclosed in commonly assigned U.S. Pat. No. 5,670,935 and published International Application No. WO 96/38319, the disclosures of which are hereby incorporated herein by reference, driver instructional data, maps, and the like, can, optionally, be co-displayed with the video image of the rearward scene. The driver instructional data, maps, and the like, can be derived from the GPS data received by the in-vehicle GPS system, and may be co-displayed via a graphic overlayer or a picture-in-a-picture, or the like.

The global-positioning system display of the present invention may be incorporated into video screens or video display assemblies, which may be displayed at or adjacent to the interior rearview mirror assembly, such as in a module or a pod or the like, such as described in U.S. utility application entitled VIDEO MIRROR SYSTEMS INCORPORATING AN ACCESSORY MODULE, filed by Kenneth Schofield, Frank O'Brien, Robert L. Bingle, and Niall R. Lynam on Feb. 26, 2001, now U.S. Pat. No. 6,690,268 and U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Jul. 21, 2000; Ser. No. 60/218,336, filed Jul. 14, 2000; and Ser. No. 60/186,520, filed Mar. 2, 2000, the entire disclosures of which are herein incorporated by reference. As described in the above-referenced applications, such video screens may be incorporated into the interior rearview mirror assembly or provided at locations within the vehicle separate from the interior rearview mirror assembly. The video display assemblies similarly may be incorporated into the interior rearview mirror assembly, such as by mounting the video display assembly to the interior mirror support or mirror mount or to a pod, or may be separately mounted, such as either above the interior rearview mirror assembly or below the interior rearview mirror assembly. For further variations and details of the mounting of the video screen(s) or the video display assembly, reference is made to the above-referenced applications.

Such video screens or video display assemblies may be used to display the output from a rear vision back-up camera, such as disclosed in co-pending application Ser. No. 09/199, 907, filed Nov. 25, 1998, now U.S. Pat. No. 6,717,610, and Ser. No. 09/361,814, filed Jul. 27, 1999, now U.S. Pat. No. 6,201,642, commonly assigned to Donnelly Corporation, the disclosures of which are herein incorporated by reference in their entireties, along with vehicle instrument status, such as a vehicle information display, such as information relating to fuel gauge levels, speed, climate control setting, GPS directional instructions, tire pressure status, instrument and vehicle function status, and the like. In addition, such video screens may display a panoramic image, such as described in U.S. Pat. Nos. 5,670,935 and 5,550,677 and U.S. patent application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, the disclosures of which are herein incorporated by reference in their entireties, and can be used instead of a conventional mirror reflector. Other displays or images that may be displayed on the video screen include: a rain sensor operation display, a telephone information display, a highway status information display, a blind spot indicator display, a hazard warning display, a vehicle status display, a page message display, a speedometer display, a tachometer display, an audio system display, a fuel gage display, a heater control display, an air-conditioning system display, a status of inflation of tires display, an E-mail message display, a compass display, an engine coolant temperature display, an oil pressure display, a cellular phone operation display, a global-positioning display, a weather information display, a temperature display, a traffic information display, a telephone number display, a fuel status display, a battery condition display, a time display, a train approach warning display, and a tollbooth transaction display. Furthermore, information displays may be incorporated which provide information to the driver or occupants of the vehicle, such as warnings relating to the status of the passenger airbag. In commonly assigned co-pending application Ser. No. 09/244,726, filed on Feb. 5, 1999, now U.S. Pat. No. 6,172, 613, information displays are provided which include information relating to vehicle or engine status, warning information, and the like, such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in co-pending, commonly assigned international application Ser. No. PCT/US94/ 01954, filed Feb. 25, 1994, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user-operated switch operated with the ignition key of the vehicle in which the mirror assembly is mounted as described in co-pending, commonly assigned U.S. patent application Ser. No. 08/799,734, filed Feb. 12, 1997, now U.S. Pat. No. 5,786,772, the disclosure of which is incorporated by reference herein in its entirety.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An accessory system of a vehicle, said accessory system comprising:
   a rearward viewing camera of the vehicle equipped with said accessory system, said rearward viewing camera having a rearward field of view external of the equipped vehicle, wherein said rearward viewing camera comprises one of a CMOS camera and a CCD camera;
   a forward viewing camera of the equipped vehicle, said forward viewing camera having a forward field of view external of the equipped vehicle, wherein said forward viewing camera comprises one of a CMOS camera and a CCD camera;
   an interior rearview mirror assembly having a mirror reflective element with a minor reflector disposed at a surface thereof, and wherein said interior rearview mirror assembly is mounted in the interior cabin of the equipped vehicle on a windshield of the equipped vehicle;
   a video display screen disposed in the interior cabin of the equipped vehicle at a location within the equipped vehicle separate from the location of said interior rearview minor assembly;
   wherein said video display screen comprises a reconfigurable video display screen, wherein said video display screen is viewable by a driver of the equipped vehicle when the driver is normally operating the equipped vehicle, and wherein said video display screen is operable to display information for viewing by the driver of the equipped vehicle;
   wherein, when the equipped vehicle is executing a reversing maneuver, said video display screen displays images captured by said rearward viewing camera to assist the driver in reversing the equipped vehicle;
   wherein said video display screen is operable to display other information and wherein said other information comprises at least one of (i) vehicle information, (ii) a vehicle instrument status, (iii) a vehicle function status, (iv) a fuel level status, (v) information relating to a speed of the equipped vehicle, (vi) tachometer information, (vii) a climate control setting status, (viii) GPS directional instructions, (ix) information relating to a global-positioning system, (x) a tire pressure status, (xi) a rain sensor status, (xii) compass information, (xiii) an engine coolant temperature status, (xiv) an oil pressure status, (xv) battery condition status, (xvi) telephone information, (xvii) telephone number information, (xviii) a page message, (xix) audio system information, (xx) an e-mail message, (xxi) a cellular phone operation status, (xxii) weather information, (xxiii) temperature information, (xxiv) highway status information, (xxv) a blind spot indicator, (xxvi) a hazard warning, (xxvii) traffic information, (xxviii) time, (xxix) a train approach warning, (xxx) a tollbooth transaction and (xxxi) a passenger airbag status; and
   wherein, during forward travel of the equipped vehicle and responsive to information pertaining to the location of the equipped vehicle and a route to a destination, said video display screen displays forward video images captured by said forward viewing camera and said video display screen displays a graphic overlay on the displayed forward video images, said graphic overlay at least one of (i) highlights a highway on/off ramp that the driver is to take to follow the route to the destination and (ii) highlights a building of the destination.

2. The accessory system of claim 1, wherein at least one of (a) said accessory system comprises a short-range wireless communication link to a portable electronic device in the equipped vehicle and (b) said accessory system comprises a vehicle data bus connection.

3. The accessory system of claim 1, comprising a transceiver operable to engage in a wireless communication with a remote service provider located at a site remote from the equipped vehicle, said transceiver located in the equipped vehicle, wherein said transceiver is operable to receive a wireless data transmission from said remote service provider of data derived from a database accessible to a remote operator associated with said remote service provider.

4. The accessory system of claim 3, wherein said accessory system, responsive to an input of the destination, wirelessly downloads to the equipped vehicle driving instructions from the then present geographical location of the equipped vehicle to the destination, and wherein the then present geographical location of the equipped vehicle is based on signals received by a global-positioning system receiver of the equipped vehicle.

5. The accessory system of claim 4, wherein said video display screen displays turn-by-turn instructions to the destination during a road journey, said turn-by-turn instructions being based on downloaded instructions, and wherein said turn-by-turn instructions comprise at least one chosen from (i) direction, (ii) when to turn and (iii) how far until the next turn.

6. The accessory system of claim 4, comprising a short-range wireless communication link to a portable electronic device in the equipped vehicle during a road journey.

7. The accessory system of claim 1, wherein said video display screen has a width dimension and a height dimension, and wherein said width dimension of said video display screen is longer than said height dimension of said video display screen.

8. An accessory system of a vehicle, said accessory system comprising:
   a rearward viewing camera of the vehicle equipped with said accessory system, said rearward viewing camera having a rearward field of view external of the equipped vehicle, wherein said rearward viewing camera comprises a CMOS camera;
   a forward viewing camera of the equipped vehicle, said forward viewing camera having a forward field of view external of the equipped vehicle, wherein said forward viewing camera comprises a CMOS camera;
   an interior rearview mirror assembly having a mirror reflective element with a mirror reflector disposed at a surface thereof, and wherein said interior rearview mirror assembly is mounted in the interior cabin of the equipped vehicle on a windshield of the equipped vehicle;

a video display screen disposed in the interior cabin of the equipped vehicle at a location within the equipped vehicle separate from the location of said interior rearview mirror assembly;

wherein said video display screen comprises a reconfigurable video display screen, and wherein said video display screen is viewable by a driver of the equipped vehicle when the driver is normally operating the equipped vehicle, and wherein said video display screen is operable to display information for viewing by the driver of the equipped vehicle;

wherein said video display screen has a width dimension and a height dimension, and wherein said width dimension of said video display screen is longer than said height dimension of said video display screen;

wherein, when the equipped vehicle is executing a reversing maneuver, said video display screen displays images captured by said rearward viewing camera to assist the driver in reversing the equipped vehicle;

wherein said video display screen is operable to display other information and wherein said other information comprises at least one of (i) vehicle information, (ii) a vehicle instrument status, (iii) a vehicle function status, (iv) a fuel level status, (v) information relating to a speed of the equipped vehicle, (vi) tachometer information, (vii) a climate control setting status, (viii) GPS directional instructions, (ix) information relating to a global-positioning system, (x) a tire pressure status, (xi) a rain sensor status, (xii) compass information, (xiii) an engine coolant temperature status, (xiv) an oil pressure status, (xv) battery condition status, (xvi) telephone information, (xvii) telephone number information, (xviii) a page message, (xix) audio system information, (xx) an e-mail message, (xxi) a cellular phone operation status, (xxii) weather information, (xxiii) temperature information, (xxiv) highway status information, (xxv) a blind spot indicator, (xxvi) a hazard warning, (xxvii) traffic information, (xxviii) time, (xxix) a train approach warning, (xxx) a tollbooth transaction and (xxxi) a passenger airbag status;

wherein, during forward travel of the equipped vehicle and responsive to information pertaining to the location of the equipped vehicle and a route to a destination, said video display screen displays forward video images captured by said forward viewing camera and said video display screen displays a graphic overlay on the displayed forward video images, said graphic overlay at least one of (i) highlights a highway on/off ramp that the driver is to take to follow the route to the destination and (ii) highlights a building of the destination; and wherein said accessory system comprises a vehicle data bus connection.

9. The accessory system of claim 8, wherein said accessory system comprises a short-range wireless communication link to a portable electronic device in the equipped vehicle.

10. The accessory system of claim 8, comprising a transceiver operable to engage in a wireless communication with a remote service provider located at a site remote from the equipped vehicle, said transceiver located in the equipped vehicle, wherein said transceiver is operable to receive a wireless data transmission from said remote service provider of data derived from a database accessible to a remote operator associated with said remote service provider.

11. The accessory system of claim 10, wherein said accessory system, responsive to an input of the destination, wirelessly downloads to the equipped vehicle driving instructions from the then present geographical location of the equipped vehicle to the destination, and wherein the then present geographical location of the equipped vehicle is based on signals received by a global-positioning system receiver of the equipped vehicle.

12. The accessory system of claim 11, wherein said video display screen displays turn-by-turn instructions to the destination during a road journey, said turn-by-turn instructions being based on downloaded instructions, and wherein said turn-by-turn instructions comprise at least one chosen from (i) direction, (ii) when to turn and (iii) how far until the next turn.

13. An accessory system of a vehicle, said accessory system comprising:

a rearward viewing camera of the [equipped] vehicle equipped with said accessory system, said rearward viewing camera having a rearward field of view external of the equipped vehicle, wherein said rearward viewing camera comprises a CMOS camera;

a forward viewing camera of the equipped vehicle, said forward viewing camera having a forward field of view external of the equipped vehicle, wherein said forward viewing camera comprises a CMOS camera;

an interior rearview mirror assembly having a mirror reflective element with a mirror reflector disposed at a surface thereof, and wherein said interior rearview mirror assembly is mounted in the interior cabin of the equipped vehicle on a windshield of the equipped vehicle;

a video display screen disposed in the interior cabin of the equipped vehicle at a location within the equipped vehicle separate from the location of said interior rearview mirror assembly;

wherein said video display screen comprises a reconfigurable video display screen, and wherein said video display screen is viewable by a driver of the equipped vehicle when the driver is normally operating the equipped vehicle, and wherein said video display screen is operable to display information for viewing by the driver of the equipped vehicle when normally mounted in the equipped vehicle;

wherein, when the equipped vehicle is executing a reversing maneuver, said video display screen displays images captured by said rearward viewing camera to assist the driver in reversing the equipped vehicle;

wherein said video display screen is operable to display other information and wherein said other information comprises at least one of (i) vehicle information, (ii) a vehicle instrument status, (iii) a vehicle function status, (iv) a fuel level status, (v) information relating to a speed of the equipped vehicle, (vi) tachometer information, (vii) a climate control setting status, (viii) GPS directional instructions, (ix) information relating to a global-positioning system, (x) a tire pressure status, (xi) a rain sensor status, (xii) compass information, (xiii) an engine coolant temperature status, (xiv) an oil pressure status, (xv) battery condition status, (xvi) telephone information, (xvii) telephone number information, (xviii) a page message, (xix) audio system information, (xx) an e-mail message, (xxi) a cellular phone operation status, (xxii) weather information, (xxiii) temperature information, (xxiv) highway status information, (xxv) a blind spot indicator, (xxvi) a hazard warning, (xxvii) traffic information, (xxviii) time, (xxix) a train approach warning, (xxx) a tollbooth transaction and (xxxi) a passenger airbag status;

wherein, during forward travel of the equipped vehicle and responsive to information pertaining to the location of the equipped vehicle and a route to a destination, said video display screen displays forward video images captured by said forward viewing camera and said video display screen displays a graphic overlay on the displayed forward video images, said graphic overlay at least one of (i) highlights a highway on/off ramp that the driver is to take to follow the route to the destination and (ii) highlights a building of the destination; and a transceiver operable to engage in a wireless communication with a remote service provider located at a site remote from the equipped vehicle, said transceiver located in the equipped vehicle.

14. The accessory system of claim 13, wherein said accessory system comprises a vehicle data bus connection.

15. The accessory system of claim 14, wherein said transceiver is operable to receive a wireless data transmission from said remote service provider of data derived from a database accessible to a remote operator associated with said remote service provider.

16. The accessory system of claim 15, wherein said accessory system, responsive to an input of the destination, wirelessly downloads to the equipped vehicle driving instructions from the then present geographical location of the equipped vehicle to the destination.

17. The accessory system of claim 16, wherein the then present geographical location of the equipped vehicle is based on signals received by a global-positioning system receiver of the equipped vehicle.

18. The accessory system of claim 17, wherein said video display screen displays turn-by-turn instructions to the destination during a road journey, said turn-by-turn instructions being based on downloaded instructions.

19. The accessory system of claim 18, wherein said turn-by-turn instructions comprise at least one chosen from (i) direction, (ii) when to turn and (iii) how far until the next turn.

20. The accessory system of claim 17, comprising a short-range wireless communication link to a portable electronic device in the equipped vehicle during a road journey.

* * * * *